(12) United States Patent
Choi et al.

(10) Patent No.: US 11,392,648 B2
(45) Date of Patent: Jul. 19, 2022

(54) CALCULATING VOICE SHARE AND COMPANY SENTIMENT

(71) Applicant: S&P Global Inc., New York, NY (US)

(72) Inventors: Hyunyoung Choi, Boston, MA (US); Yuanli Pei, Boston, MA (US); Yue Wen, Boston, MA (US); Jiachen Xu, Jersey City, NJ (US); Seung-jae Bang, Brooklyn, NY (US)

(73) Assignee: S&P Global Inc., New York, NY (US)

( * ) Notice: Subject to any disclaimer, the term of this patent is extended or adjusted under 35 U.S.C. 154(b) by 288 days.

(21) Appl. No.: 16/834,251

(22) Filed: Mar. 30, 2020

(65) Prior Publication Data
US 2021/0303634 A1    Sep. 30, 2021

(51) Int. Cl.
| | | |
|---|---|---|
| *G06F 16/90* | (2019.01) | |
| *G06F 16/9032* | (2019.01) | |
| *G06F 16/903* | (2019.01) | |
| *G10L 15/22* | (2006.01) | |
| *G10L 15/26* | (2006.01) | |

(52) U.S. Cl.
CPC .. *G06F 16/90332* (2019.01); *G06F 16/90344* (2019.01); *G10L 15/22* (2013.01); *G10L 15/26* (2013.01)

(58) Field of Classification Search
None
See application file for complete search history.

(56) References Cited

U.S. PATENT DOCUMENTS

| | | | | |
|---|---|---|---|---|
| 7,359,951 | B2 * | 4/2008 | Goel | G06F 16/248 |
| | | | | 709/219 |
| 9,691,089 | B2 * | 6/2017 | Grass | G06Q 30/0609 |
| 2005/0108227 | A1 * | 5/2005 | Russell-Falla | G06F 16/9535 |
| | | | | 707/999.005 |
| 2009/0157417 | A1 * | 6/2009 | Bradley | G06Q 30/02 |
| | | | | 705/318 |
| 2009/0199267 | A1 * | 8/2009 | Blackburn | G06F 21/6218 |
| | | | | 707/999.005 |
| 2012/0047581 | A1 * | 2/2012 | Banerjee | G06F 21/554 |
| | | | | 726/23 |
| 2014/0108029 | A1 * | 4/2014 | Kim | G16H 80/00 |
| | | | | 705/2 |
| 2020/0151222 | A1 * | 5/2020 | Mannar | G06V 10/30 |
| 2020/0327548 | A1 * | 10/2020 | Hartard | G06Q 20/12 |
| 2021/0133648 | A1 * | 5/2021 | Bennett | G06F 21/577 |

* cited by examiner

*Primary Examiner* — Neeraj Sharma
(74) *Attorney, Agent, or Firm* — Yee & Associates, P.C.

(57) ABSTRACT

A method of determining controversy voice share is provided. The method comprises identifying keywords related to a controversy topic and identifying information sources relevant to the controversy topic based on occurrences of the keywords within each source. An external voice score is calculated for an organization regarding the controversy topic, wherein the external voice score is calculated based on information sources that are external to the organization. An internal voice score is calculated for the organization regarding the controversy topic, wherein the internal voice score is calculated based on information sources internal to the organization. An overall voice share of the organization is then calculated from the external voice score and internal voice score. The overall voice share of the organization represents a proportion of influence the organization contributes to public commentary on the controversy topic relative to other organizations within a same industry sector.

30 Claims, 6 Drawing Sheets

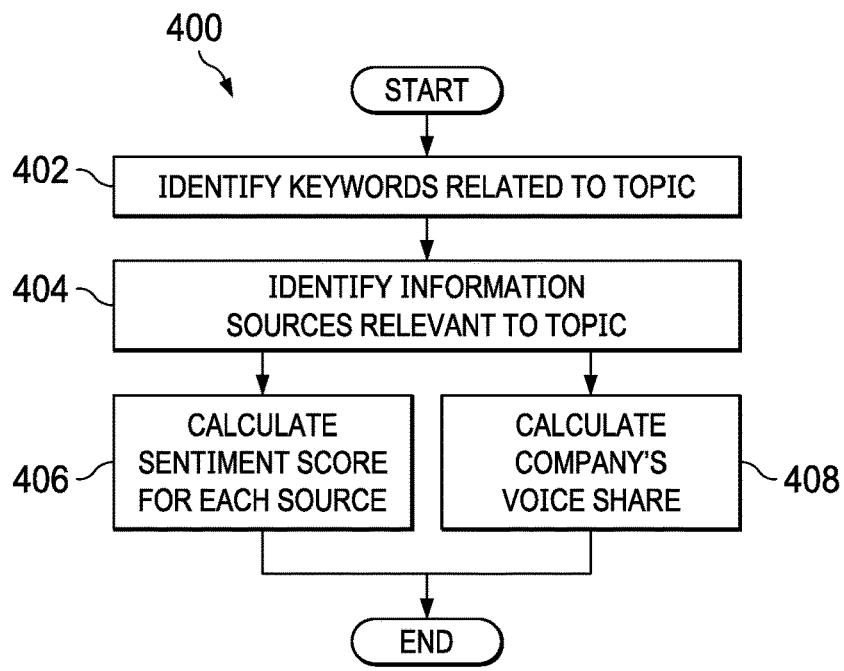
FIG. 4
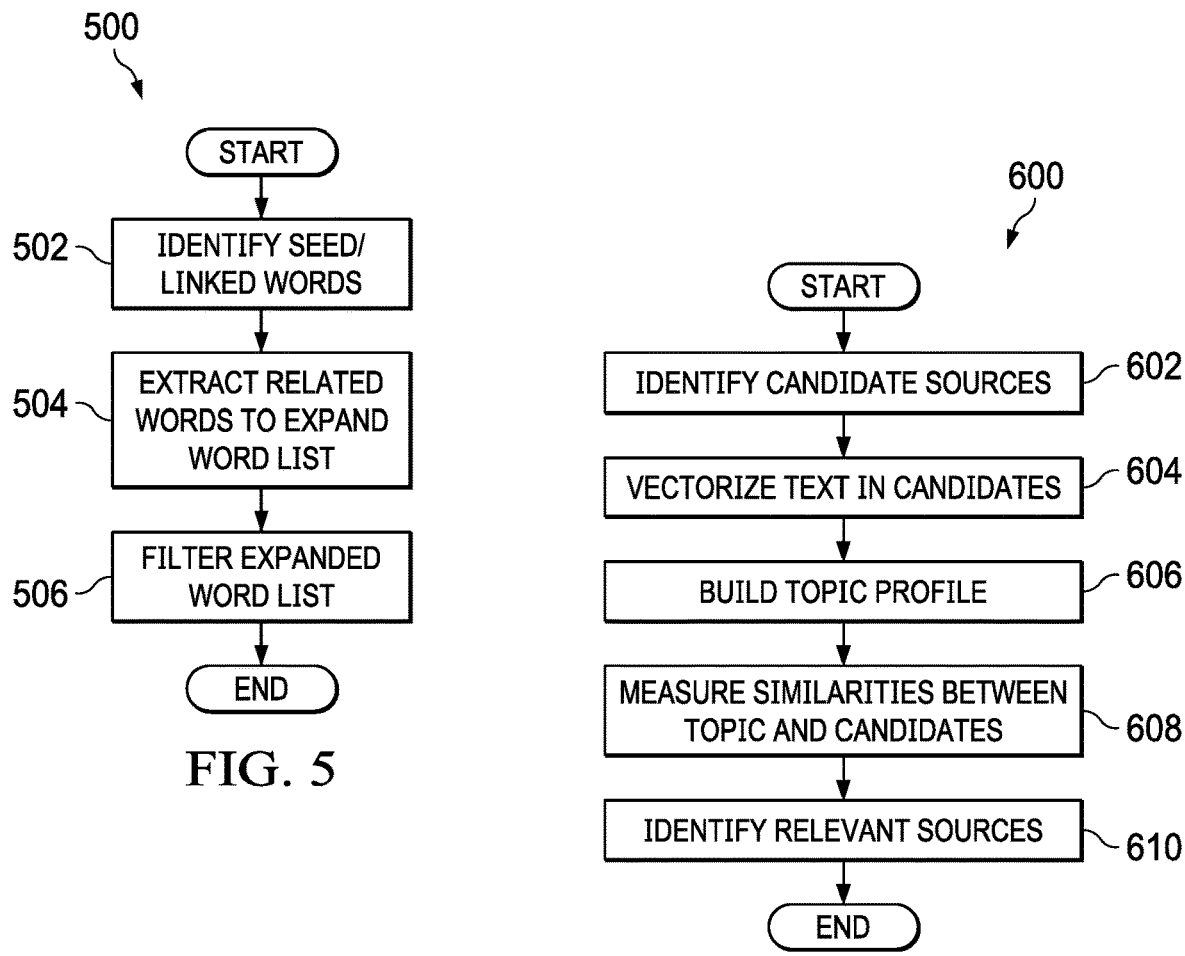
FIG. 5
FIG. 6

CALCULATING VOICE SHARE AND COMPANY SENTIMENT

BACKGROUND INFORMATION

1. Field

The present disclosure relates generally to computer-implemented modeling, and more specifically to determining the public voice share and sentiment of an organization regarding a controversy.

2. Background

Environmental, social, and governance (ESG) refer to categories describing the sustainability and societal impact of company activities and controversies. Examples of ESG topics and controversies include data privacy, labor disputes, and pollution. ESG criteria might be used by investors to determine risks and future financial performance of companies.

Therefore, it would be desirable to have a method and apparatus that take into account at least some of the issues discussed above, as well as other possible issues.

SUMMARY

An embodiment of the present disclosure provides a method of determining controversy voice share. The method comprises identifying a number of keywords related to a controversy topic and identifying a number of information sources relevant to the controversy topic based on occurrences of the keywords within each source. An external voice score is calculated for an organization regarding the controversy topic, wherein the external voice score is calculated based on information sources that are external to the organization. An internal voice score is calculated for the organization regarding the controversy topic, wherein the internal voice score is calculated based on information sources internal to the organization. An overall voice share of the organization is then calculated from the external voice score and internal voice score. The overall voice share of the organization represents a proportion of influence the organization contributes to public commentary on the controversy topic relative to other organizations within a same industry sector.

Another embodiment provides a system for of determining controversy voice share. The system comprises a storage device configured to store program instructions and one or more processors operably connected to the storage device and configured to execute the program instructions to cause the system to: identify a number of keywords related to a controversy topic; identify a number of information sources relevant to the controversy topic based on occurrences of the keywords within each information source; calculate an external voice score for an organization regarding the controversy topic, wherein the external voice score is calculated based on a number of public information sources that are external to the organization; calculate an internal voice score for the organization regarding the controversy topic, wherein the internal voice score is calculated based on a number of information sources internal to the organization; and calculate an overall voice share of the organization from the external voice score and internal voice score, wherein the overall voice share of the organization represents a proportion of influence the organization contributes to public commentary on the controversy topic relative to other organizations within a same industry sector.

Another embodiment provides a computer program product for determining controversy voice share. The computer program product comprises a computer-readable storage medium having program instructions embodied thereon to perform the steps of: identifying a number of keywords related to a controversy topic; identifying a number of information sources relevant to the controversy topic based on occurrences of the keywords within each information source; calculating an external voice score for an organization regarding the controversy topic, wherein the external voice score is calculated based on a number of public information sources that are external to the organization; calculating an internal voice score for the organization regarding the controversy topic, wherein the internal voice score is calculated based on a number of information sources internal to the organization; and calculating an overall voice share of the organization from the external voice score and internal voice score, wherein the overall voice share of the organization represents a proportion of influence the organization contributes to public commentary on the controversy topic relative to other organizations within a same industry sector.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 depicts a flowchart of a process for determining voice share and sentiment in media sources regarding a topic of controversy in accordance with an illustrative embodiment;

FIG. 5 depicts a flowchart for a process of creating a keyword list for a topic in accordance with an illustrative embodiment;

FIG. 6 depicts a flowchart of a process for identifying relevant information sources in accordance with an illustrative embodiment;

DETAILED DESCRIPTION

The illustrative embodiments recognize and take into account one or more different considerations. For example, the illustrative embodiments recognize and take into account that ESG criteria might be used by investors to determine risks and future financial performance of companies.

The illustrative embodiments also recognize and take into account that public statements regarding a particular ESG controversy typically originate from a number of different sources including media outlets and company statements. These statements together constitute the "voice" regarding a given ESG topic or controversy. The contribution that a particular organization makes to the total voice on a topic constitutes that organization's voice share.

The illustrative embodiments also recognize and take into account that an organization's voice share reflects the degree to which the organization influences how a topic or controversy gets broadcast into the market. Larger organizations tend to have greater influence on how a controversy issue is broadcast to the market than smaller organization.

The illustrative embodiments also recognize and take into account that there is growing interest from the financial community to invest in companies with their ESG impact into consideration. However, currently there is no quantitative metric for assessing a company's ESG impact.

The illustrative embodiments provide a method for systematically measuring the voice share (rate of participation) for a controversy topic across all companies from various information sources such as social media, news outlets, and company earnings transcripts. For example, if a company is involved in a labor dispute, given an observed amount of articles and posts on the topic, the illustrative embodiments can determine how much voice share the company involved in the dispute has on the subject of labor dispute compared to its peers in the industry sector.

The illustrative embodiments provide a method to systematically compute sentiment on a topic across all organizations/companies by combining the overall market sentiment with voice share.

The quantitative metric produced by the illustrative methods can be used to rank order companies to determine which companies have the highest participation for a given ESG controversy topic of focus. The time series of sentiment or voice share can be used as a comparison of companies on a particular ESG topic.

Figure 1:
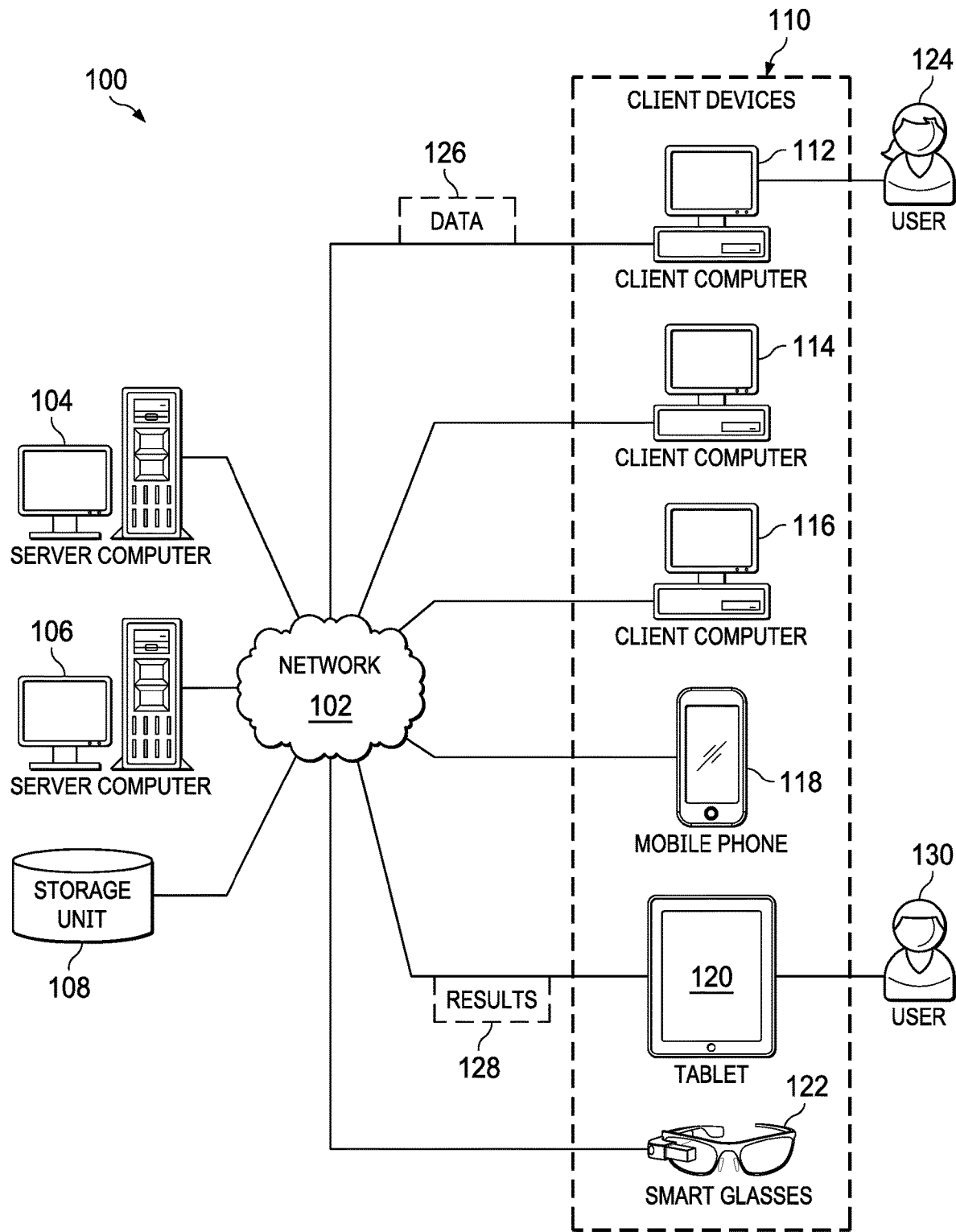
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, users 124 at client computer 112 can enter data 126 for processing on server computer 104 and storage in a database, e.g., on storage unit 108. In this illustrative example, server computer 104 might produce computational results 128 supplied to user 130 operating client device 120.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from interactions with an environment. Algorithms such as Q-learning are used to train the predictive model through interacting with the environment using measurable performance criteria.

Figure 2:
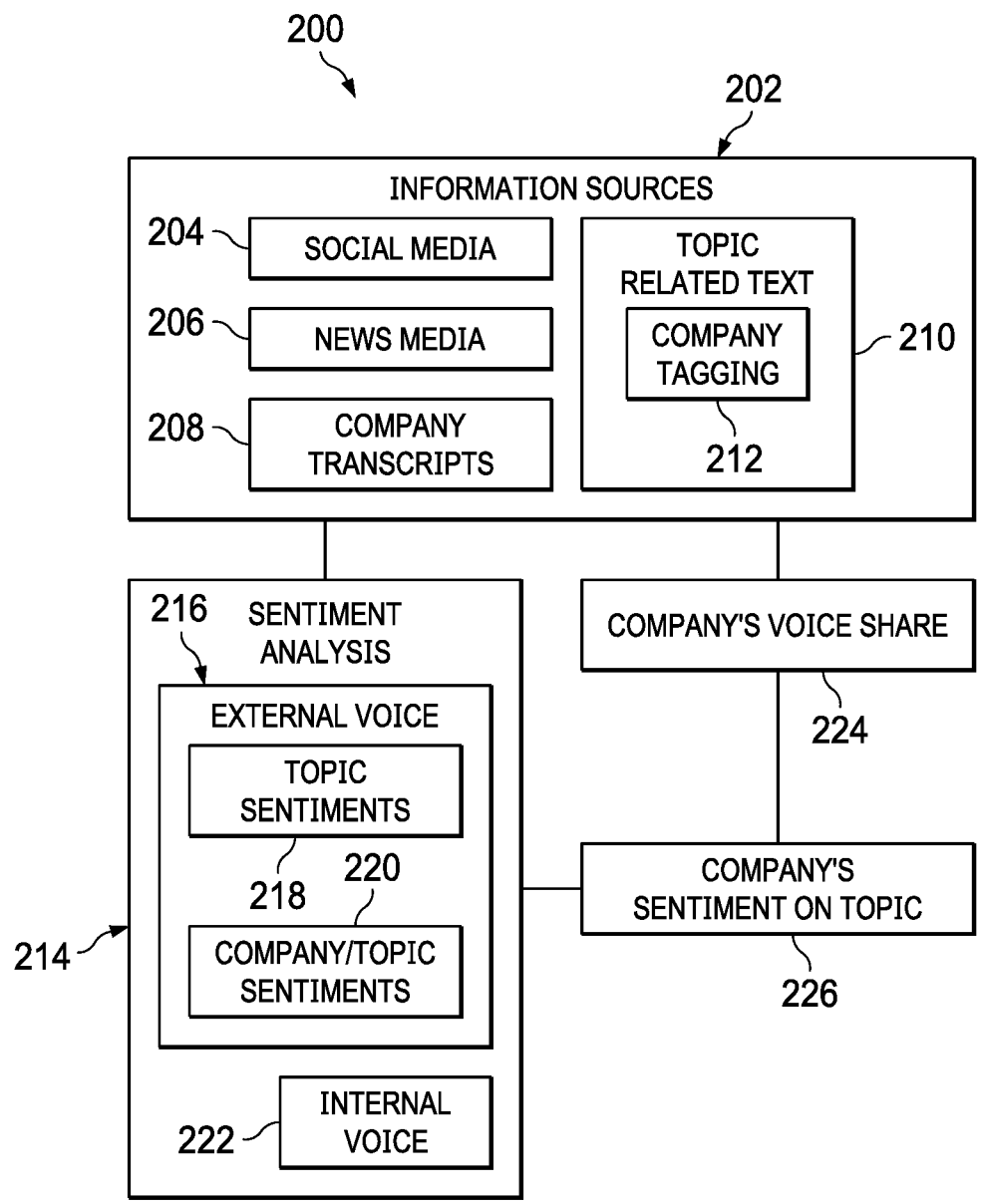
FIG. 2 depicts a block diagram illustrating the operation of a voice share and sentiment determination system in accordance with an illustrative embodiment.

FIG. 2 depicts a block diagram illustrating the operation of a voice share and sentiment determination system in accordance with an illustrative embodiment. System 200 might be implements in a data processing environment such as Network data processing system 100 shown in FIG. 1.

The operation of system 200 comprises three main parts: topic corpus identification, sentiment analysis and voice share, and sentiment time series.

Given an ESG controversy issue (e.g., a labor dispute), system 200 can identify a relevant subset of the corpus universe from a number of data sources 202. Examples of data sources include social media sites 204, news media 206, and company earnings transcripts 208. From these information sources 202, system 200 might identify topic related text 210 regarding the ESG controversy. Within the topic related text 210, system 200 might also identify company tagging 212, which comprises mentions of a company in connection with the controversy in question.

System 200 starts by defining a list of seed words that carry direct meaning of the topic (e.g., labor strike, labor unrest, etc.). This list is obtained, e.g., through screening the first paragraph of the Wikipedia® page of the controversy subject, which defines the subject. Through the seed word list, system 200 extracts a subset of the corpus that contains these seed words in headers and builds a "core corpus profile" by vectorizing the documents. This profile represents documents that are the most closely related to the subject.

Among these documents, system 200 can identify "coarse keywords" through unsupervised techniques (e.g., Textrank, word embedding) which represents words that are closely related to the topic. Using these words, system 200 can extract a "coarse corpus" to expand on the set of articles from the "core corpus," which might be too narrow. However, this extraction might include noisy documents that are irrelevant to the ESG topic in question.

Using the relationship between the "coarse corpus" and "core corpus profile," system 200 can score the relevance to the ESG topic for each document in the "coarse corpus" set. This scoring leverages various unsupervised methods (such as mixture modelling, classification with automatic sampling, etc.) so that the relevance of each document in the "coarse corpus" can be determined while minimizing human intervention.

For the extracted documents, system 200 can employ standard sentiment analysis techniques. The output of the sentiment analysis model is a continuous score in the range of −1 and 1 for each of the documents extracted from information sources 202.

Sentiment analysis 214 distinguishes between media statements produced within a company (i.e. company earning transcripts 208) from media statements that are produced outside of the company (i.e. social medial 204, news media 206), since these media might have different characteristics. Media statements produced outside the company in question constitute an external voice 216 regarding a controversy topic. External voice 216 might comprise topic sentiments 218 that express sentiments regarding the controversy topic within, e.g., the general population, industry, or sector. External voice 216 might also comprise company/topic sentiments 220 that express how parties outside the company view the company in relation to the controversy topic. Internal voice 222 expresses how the company views itself in relation to the controversy topic.

System 200 can determine the company's voice share 224 of the total public voice regarding the controversy topic. Using sentiment analysis 214 and the company's voice share 224, system 200 can determine the company's sentiment 226 on the controversy topic.

Figure 3:
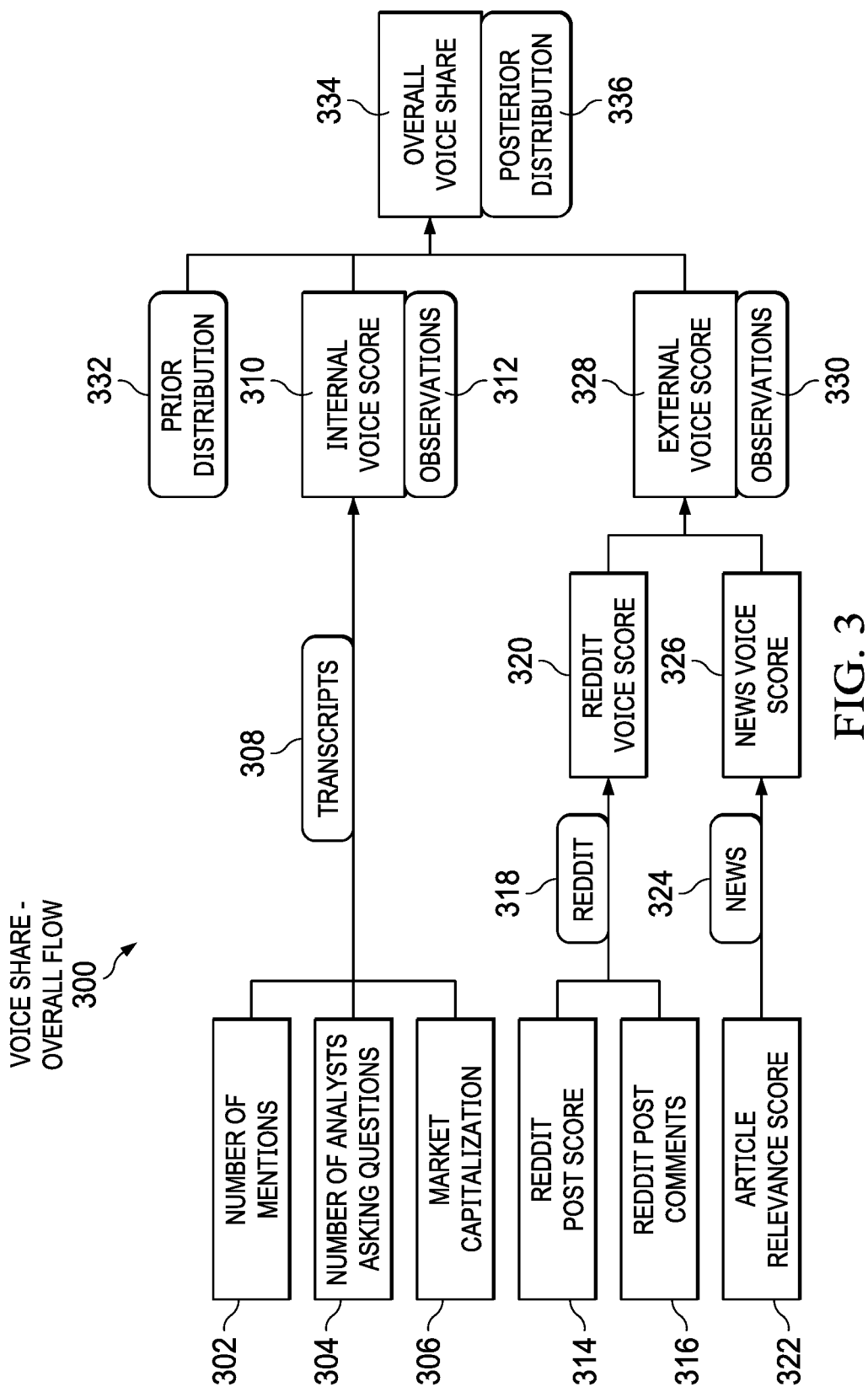
FIG. 3 depicts a block diagram illustrating the operation of a voice share and sentiment time series in accordance with an illustrative embodiment.

FIG. 3 depicts a block diagram illustrating the operation of a voice share time series in accordance with an illustrative embodiment. Time series 300 might be might applied within system 200 in FIG. 2.

"Voice share" is a company-level proportion score that reflects an organization/company's voice (public participation/engagement) towards a particular ESG controversy issue. The voice share can also be defined within a sector such that the sum of voice share of the companies within a sector for a given point in time adds to 1. System 200 can define a company-level sentiment 226 as sector-level sentiment times the voice share of that company.

As shown in system 200 and time series 300, a distinction can be made between "internal" and "external" voice score. Internal voice score is a measure of how the company views itself towards the topic and can be inferred through transcripts. External voice score is a measure of how the company is being viewed by the public towards the topic and can be inferred through social media and news.

As shown in FIG. 3, the overall voice share is derived through combining the voice feature scores. Overall voice share represents a proportion of influence the organization/company contributes to public commentary on a controversy topic relative to other organizations within the same industry sector. Arriving at a proportion based simply on observed media at each point in time might pose problems. For example, a company might be exposed to a large number of media posts for a given topic on a particular day but not have any media coverage over subsequent days. The illustrative embodiments calculate a voice share that captures latent structures that are not directly observed in the media.

The method of the illustrative embodiments assumes that a company's voice regarding a topic will have a gradually diminishing residual effect after the point in time when the voice is first observed. In addition, the illustrative embodiments assume that larger companies have more control over how a controversy topic is broadcast into the public/market. If this is not naturally captured through the volume of data, the voice share can be adjusted to account for this factor.

To account for companies missing data, and also to allow voice share for companies to decay over time, various smoothing techniques (e.g., exponential smoothing, market capitalization weighting) can be used to derive voice scores.

The internal voice share score 310 represents the score relative to the controversy topic that is inferred from company transcripts 308, which comprise the number of keyword mentions 302 (e.g., within earnings transcript presentations, analyst questions, and answers) related to the controversy for company i at time t and the number of analysts 304 asking questions regarding the controversy topic for company i at time t.

Formally, the internal voice score 310 can be represented as $$VC_i^{Internal}(t_q) = ns_i(t) + na_i(t) \qquad \text{Eq. (1)}$$

$$VC_s^{Internal}(t_q) = \sum_{i \in s} VC_i^{Internal}(t_q) \qquad \text{Eq. (2)}$$

where, $VC_i^{Internal}(t_q)$ represents the internal voice score for company i at time t S represents sector $VC_s^{Internal}(t_q)$ represents the sector level voice score.

Company transcripts are usually released on a quarterly basis, discuss events based on the previous quarter relative to the release date, and the release dates are scattered across companies. Therefore, the illustrative embodiments align the timing of internal voices scores to be at the previous quarter end dates relative to the release date. From equation (1) t denotes the company transcript release date and $t_q$ denotes the end date of the preceding quarter.

The raw internal voice $VC_i^{Internal}(t_q)$ in equation (1) does not take into account that larger companies have more control over how a controversy issue gets broadcast into the market. This quality of larger companies is not naturally captured through the volume of internally generated data, because the amount of transcript data for each company is roughly the same, regardless of market share. The illustrative embodiments can use market capitalization 306 as representative of a company's size and then weight transcripts 308 by market capitalization 306 when calculating internal voice share 310.

Assuming market capitalization value across companies to be lognormally distributed, the illustrative embodiments can log-transform market capitalization 306 and define the market capitalization weight as $$w_i^{MC}(t) = \frac{\log(MC_i(t))}{\sum_{j \in s} \log(MC_j(t))} \qquad \text{Eq. (3)}$$

where $MC_i(t)$ denotes the market capitalization of company i at time t.

The market capitalization-weighted proportion for company i at time t can be referred to as the internal voice share and represented as $$VS_i^{Internal}(t) = \frac{w_i^{MC}(t) \cdot VC_i(t)}{\sum_{j \in s} w_j^{MC}(t) \cdot VC_j(t)} \qquad \text{Eq. (4)}$$

The adjusted internal voice score, which includes the market capitalization weighting effect, can then be derived as $$AVC_i^{Internal}(t) = VC_s^{Internal}(t) \cdot VS_i^{Internal}(t) \qquad \text{Eq. (5)}$$

The adjusted internal voice score can be normalized by the inter-quartile range (IQR), wherein the IQR for time t is calculated from the history of the data points preceding t. Normalization is important for combining time series of different magnitudes or scales (e.g., internal voice score 310 and external voice score 328). The normalized adjusted internal voice score for company i at time t can be denoted as $$NVC_i^{Internal}(t) = \frac{AVC_i^{Internal}(t)}{IQR(AVC_i^{Internal}(t))} \qquad \text{Eq. (6)}$$

The external voice score 328 is the score relative to the controversy topic that is inferred from Reddit® posts 318 and news stories 324. Reddit® is a news aggregation website on which members can submit content such as links, text-based posts, and images that are organized by subject (e.g., news, science, books, movies, etc.). Members can post comments related to posts and generate conversations on specific topics. It should be understood the illustrative embodiments can be applied to any similar type of news/topic aggregation site/service that allows user to post and discuss topical news items. Reddit is used herein as a convenient example for ease of illustration.

A Reddit® voice score 320 represents the score relative to the controversy topic inferred from Reddit (or similar platform) postings 318 and comprises a Reddit® post score 314 and Reddit® post comments 316. The Reddit score 314 is the total score for Reddit® postings in which a controversy topic keyword is mentioned for company i at time t. Reddit® post comments 316 are the total number of comments in the Reddit® posts regarding the controversy topic for company i at time t.

Because Reddit® posts' scores 314 and post comments 316 have different scale (score is a more active metric and usually has larger variation in count than comments), the illustrative embodiments normalize each feature before aggregating. Assuming that both Reddit® score 314 and post comments 316 are log normally distributed across companies aggregated weekly, the log-transformed values can be denoted $$LogScores_i(t) = \log(Scores_i(t))$$

$$LogComments_i(t) = \log(Scores_i(t))$$

Each feature can be normalized by its IQR, wherein the IQR for time t is calculated from the history of the data points preceding t. For example, the IQR for LogScores at time t can be derived from all the $LogScores_i(s)$ across all companies and all $s \in [t-52, t]$.

The normalized Reddit® voice score 320 for company i at time t can be defined as the sum of the normalized features $$NVC_i^{Reddit}(t) = \frac{LogScores_i(t)}{IQR(LogScores)(t)} + \frac{LogComments_i(t)}{IQR(LogComments)(t)} \qquad \text{Eq. (7)}$$

The news voice score 326 is the score relative to the controversy topic inferred from news media data 324 and comprises an article relevance score 322. The Article relevance score 322 is the total relevance score of news articles in which a controversy topic keyword is mentioned for company i at time t. If a news item is more relevant to the controversy topic in question, that news item will contribute to a larger voice. A normalized news voice score 326 for company i at time t can be calculated as $$NVC_i^{News}(t) = \frac{LogRelevance\,Score_i(t)}{IQR(LogRelevance\,Scores)(t)} \quad \text{Eq. (8)}$$

where $LogRelevanceScores_i(t) = \log(Relevance\,Scores_i(t))$.

The normalized external voice score 328 is the score related to the controversy topic that is inferred from both Reddit® voice score 320 and news voice score 326 and can be derived as $$NVC_i^{External}(t) = NVC_i^{Reddit}(t) + NVC_i^{News}(t) \quad \text{Eq. (9)}$$

In combining the normalized internal voice score 310 and normalized external voice score 328 into ab overall voice share 334, time series 300 follows a Bayesian framework in which there is a predefined prior distribution 332, and both the internal and external voice scores are assumed to be observed samples from a likelihood distribution. The voice shares of companies in a sector is treated as a random variable that adds up to 1 across the companies.

The calculation begins with the prior that the "true" shares of K companies are distributed as a Dirichlet distribution 332, absent any other information.

$$\vec{r} \sim Dir(\vec{\alpha}_0)$$

where $\vec{p}$ and $\vec{\alpha}_o$ are both K-dimensional vectors.

The weighted sum of the normalized internal voice score 310 and normalized external voice score 328 can be referred to as observations, $\overrightarrow{obs}$ 312, 330 and expressed $$\overrightarrow{obs}(t) = \beta \cdot \overrightarrow{NVC^{Internal}}(t) + \overrightarrow{NVC^{External}}(t) \quad \text{Eq. (10)}$$

Where β is a mixing parameter between the internal voice score 310 and external voice score 328 and accounts for the fact that the two types of voice occur at different frequencies. The calculation method assumes the observations 312, 330 up to time t are sample observations from the multinomial distribution with parameter $\vec{p}$ having the prior distribution 332.

From the conjugate-prior relationship of Dirichlet prior and multinomial distribution, the posterior distribution 336 of $\vec{p}$ is derived $$\vec{p}\,|U_{s\leq t}\overrightarrow{obs}(s) \sim Dir(\vec{\alpha}(t))$$

where $$\vec{a}(t) = \vec{\alpha}_0 + \Sigma_{s\leq t}\overrightarrow{obs}(s) \quad \text{Eq. (11)}$$

Equation (11) is adjusted to account for a time decaying effect of past observations by introducing a discount factor γ and discounted observation sum, defines as $$\overrightarrow{dobs}(t) = \Sigma_{s=0}^t \gamma^{t-s} \cdot \overrightarrow{obs}(s)$$

Here, γ can control the weighting between recency versus historical observations. Using this discounted observation sum, equation (11) becomes express as $$\vec{a}(t) = \vec{\alpha}_0 + \overrightarrow{dobs}(t) \quad \text{Eq. (11)}_{adj.}$$

The overall voice share 334 for company i at time t is calculated as the expected value of the posterior distribution 336

$$VS_i^{Combined}(t) = E[(\vec{p})i\,|\,\bigcup_{s\leq t}\overrightarrow{obs}(s)] = \frac{\alpha_i(t)}{\sum_j \alpha_j(t)} \quad \text{Eq. (12)}$$

$\vec{\alpha}_0$, β, and γ are the hyperparameters of the model that might be set as $\vec{\alpha}_0 = [0.1, \ldots, 0.1]^T$, β=13, and γ=0.95. The choice for β reflects the frequency of 13 weeks in a quarter, as the external voice score 328 has a weekly frequency, while the internal voice score 310 has a quarterly frequency.

The weekly combined voice share 334 can be used to easily compute weekly company-level sentiment for the companies.

A sector level voice share can be inferred from the external voice parts 320, 326 for each sector relative to the controversy topic. Calculating the sector level voice share follows similar logic to the combined overall voice share 334 based on the discounted observation sum from the external voice parts 320, 326 for which the keyword related to the controversy topic was mentioned for company i within sector s at time t. Formally, then discounted sector observation sum can be denoted $$dobs_s(t) = \Sigma_{i \in s} dobs_i(t)$$

The adjusted equation of the sector level voice share generation is $$VS_i^{Sector}(t) = \frac{\alpha_s(t)}{\sum_s \alpha_s(t)} \quad \text{Eq. (13)}$$

where $$\vec{a}(t) = \vec{\alpha}_0 + \overrightarrow{dobs}(t)$$

Again, the hyperparameter settles the same as $\vec{\alpha}_0 = [0.1, \ldots, 0.1]^T$.

FIG. 4 depicts a flowchart of a process for determining voice share and sentiment in media sources regarding a topic of controversy in accordance with an illustrative embodiment. Process 400 might be implemented in sentiment estimation system 200 in FIG. 2.

Process 400 begins by identifying a number of keywords related to a specified controversy topic (step 402). A number of information sources are then identified as relevant to the topic based on occurrences of keywords within each information source (step 404).

After the relevant information sources are identified, a sentiment score related to the topic can be calculated for each identified information source (step 406).

In addition to calculating a sentiment score for each source, a share of the company's participation in the related the topic (voice share) can also be calculated across the identified information sources for a specified time period (step 408).

FIG. 5 depicts a flowchart for a process of creating a keyword list for a topic in accordance with an illustrative embodiment. Process 500 is a more detailed depiction of step 402 in FIG. 4.

Process 500 begins by identifying a first number of keywords related to the topic from a number of reference sources that provide definitions or explanations of the topic (step 502). These initial keywords might comprise linked works in online media sources or manually extracted seed words that are semantically similar to a topic word.

The word list is expanded by identifying, through automated phrase extraction, additional keywords related to the topic in the reference sources, wherein the phrase extraction correlates to initial linked/seed word to the additional words in the expanded list (step 504).

The expanded keyword list is then filtered (step 506). This filter might employ natural language processing (NLP) techniques such as, e.g., named entity recognition, part-of-speech tagging, and word embedding.

FIG. 6 depicts a flowchart of a process for identifying relevant information sources in accordance with an illustrative embodiment. Process 600 is a detailed depiction of a subprocess in step 404 in FIG. 4.

Process 600 begins by identifying a number of candidate information sources that include keywords in headers (step 602). Text in the candidate information sources is then vectorized (step 604), and a topic profile is built based on the text vectorization (step 606).

Similarities between the topic and the candidate information sources can then be measured according to the profile (step 608). Relevant information sources can be identified according to a threshold of similarity between information sources and the topic (step 610). The threshold of similarity might be established according to Gaussian mixture modelling and expectation-maximation. Supervised classification methods can be employed with automatic sampling techniques. Semi-supervised topic modeling can be used to identify the corpus of sources relevant to the topic/controversy in question.

Figure 7:
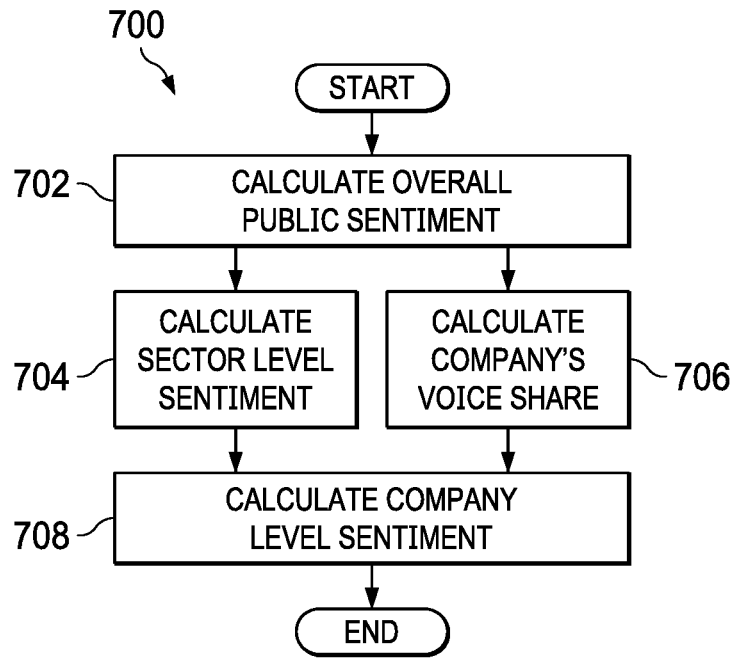
FIG. 7 depicts a flowchart for a process of determining company-level sentiment in accordance with an illustrative embodiment.

FIG. 7 depicts a flowchart for a process of determining company-level sentiment in accordance with an illustrative embodiment. Process 700 is an additional refinement of step 406 in FIG. 4 wherein voice share (contribution to sentiment) is defined within a specific sector. Sentiment can be thought of as a use case of voice share. Since voice share is an attribution rate of public participation in the context of a controversy topic, this attribution can be used in conjunction with the overall (market level) sentiment to attribute sentiment to individual companies.

Process 700 begins by determining overall public sentiment regarding the controversy topic (step 702). Overall public sentiment represents an attitude regarding the controversy topic derived from public information sources that are external to the organization (i.e. external voice in news and social media). The internal voice is not used to generate overall sentiment because it could include company specific bias since it includes the company discussing itself regarding the controversy.

The overall public sentiment might comprise the following features:

1) Relevance Score$_j$(t): the relevance score of a news article for which the keyword related to the controversy topic was mentioned for article j at time t.

2) Score$_j$(t): the Reddit post score for post j (which related to the controversy topic) at time t.

3) Comment (t): the number of post comments for Reddit post j (which related to the controversy topic) at time t.

4) RedditSent$_j$(t): the sentiment score of a Reddit® post in which the keyword related to the controversy topic is mentions for post j at week t.

5) NewsSent$_j$(t): the sentiment score of a news article in which the keyword related to the controversy topic is mentions for post j at week t.

These features are generated from all Reddit® posts and news articles at week t, whether or not the post or article mentions a company name. When aggregating an overall sentiment, considering the different scales of features associated with the Reddit® posts and news articles, each sentiment is normalized first before aggregating.

The sentiment estimation begins with a log transform. It is assumed that Reddit® scores, comments, and news relevance scores are log normally distributed. Following this assumption, log-transformed values are used $$LogScores_j(t)=\log(Scores_j(t))$$

$$LogComments_j(t)=\log(Comments_j(t))$$

$$LogRelevance\ Score_j(t)=\log(Relevance\ Score_j(t))$$

In order to assign more importance to posts or articles that have higher user interaction or relevance, a weighted sentiment is calculated using the above features. The adjusted Reddit® and new sentiments at week t are calculated as $$ASENT^{Reddit}(t)=\Sigma_j(LogScore_j(t)+LogComments_j(t))\times RedditSent_j(t) \qquad \text{Eq. (14)}$$

$$ASENT^{News}(t)=\Sigma_j(LogRelevance\ Score_j(t))\times NewsSent_j(t) \qquad \text{Eq. (15)}$$

The normalized sentiments from Reddit and news are then aggregated to generate the overall sentiment $$SENT(t)=NSENT^{Reddit}(t)+NSENT^{News}(t) \qquad \text{Eq. (16)}$$

After overall sentiment is calculated, a sector level sentiment is calculated for sector s at time t (step 704). Sector level sentiment represents the general attitude of the specific industry sector to which the company belongs relative to the controversy topic. Sector level sentiment is derived from the overall public sentiment and sector level voice share and can be calculated from Eq. 13 above. The sentiment for sector s at week t can be denoted $$SENT_s(t)=VS_s^{sector}(t)\times SENT(t) \qquad \text{Eq. (17)}$$

The company voice share regarding the controversy topic is also calculated at week t (step 706).

A company-level sentiment can then be calculated for company i at week t (step 708). The company level sentiment is derived from both the sector level sentiment and the overall voice share of the company. This follows the insight that company level sentiment is influenced by the sector level activities related to the controversy topic and the company's own participation within the sector. The sentiment score for company i at week t is denoted $$SENT_i(t)=VS_i^{Combined}(t)\times SENT_s(t) \qquad \text{Eq. (18)}$$

Figure 8:
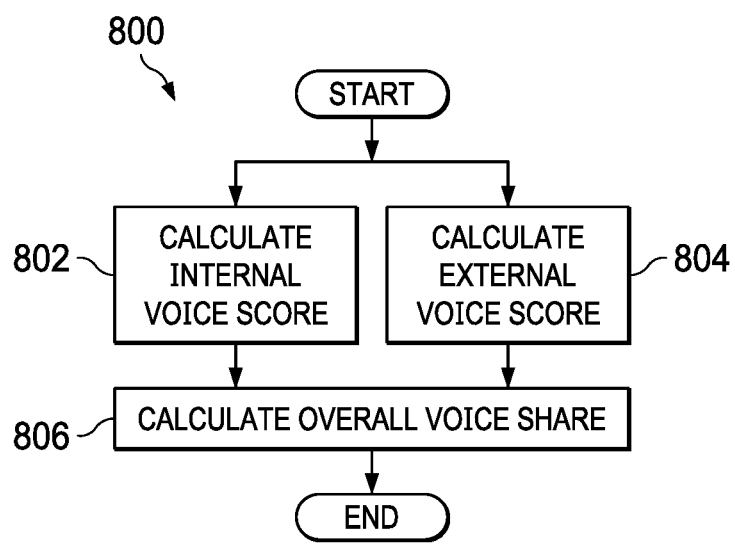
FIG. 8 depicts a flowchart for a process of determining an organization's share of participation in a topic of controversy in accordance with an illustrative embodiment.

FIG. 8 depicts a flowchart for a process of determining an organization's share of participation in a topic of controversy in accordance with an illustrative embodiment. Process 800 is a more detailed depiction of step 408 in FIG. 4 and is an example application of time series 300 in FIG. 3.

Process 800 calculates an internal voice score for the organization based on information sources internal to the organization (step 802). Internal voice score measures how parties within the organization view the organization relative to the topic. Internal voice score might be weighted according by capitalization/market share of the organization.

Process 800 also calculates an external voice score for the organization based on information sources external to the organization (step 804). External voice score measures how parties external to the organization view the organization relative to the topic.

An overall voice share is calculated for the organization from the internal voice score and the external voice score (step 806). The overall voice share can be calculated as a Bayesian inference in which there is a predefined prior, and the internal and external voice scores are assumed to be observed samples from a likelihood distribution. The posterior distribution is derived from the predefined prior and the internal and external voice scores, and the combined voice share is calculated as the expectation of the posterior distribution. Step 806 is equivalent to step 706 in FIG. 7.

Figure 9:
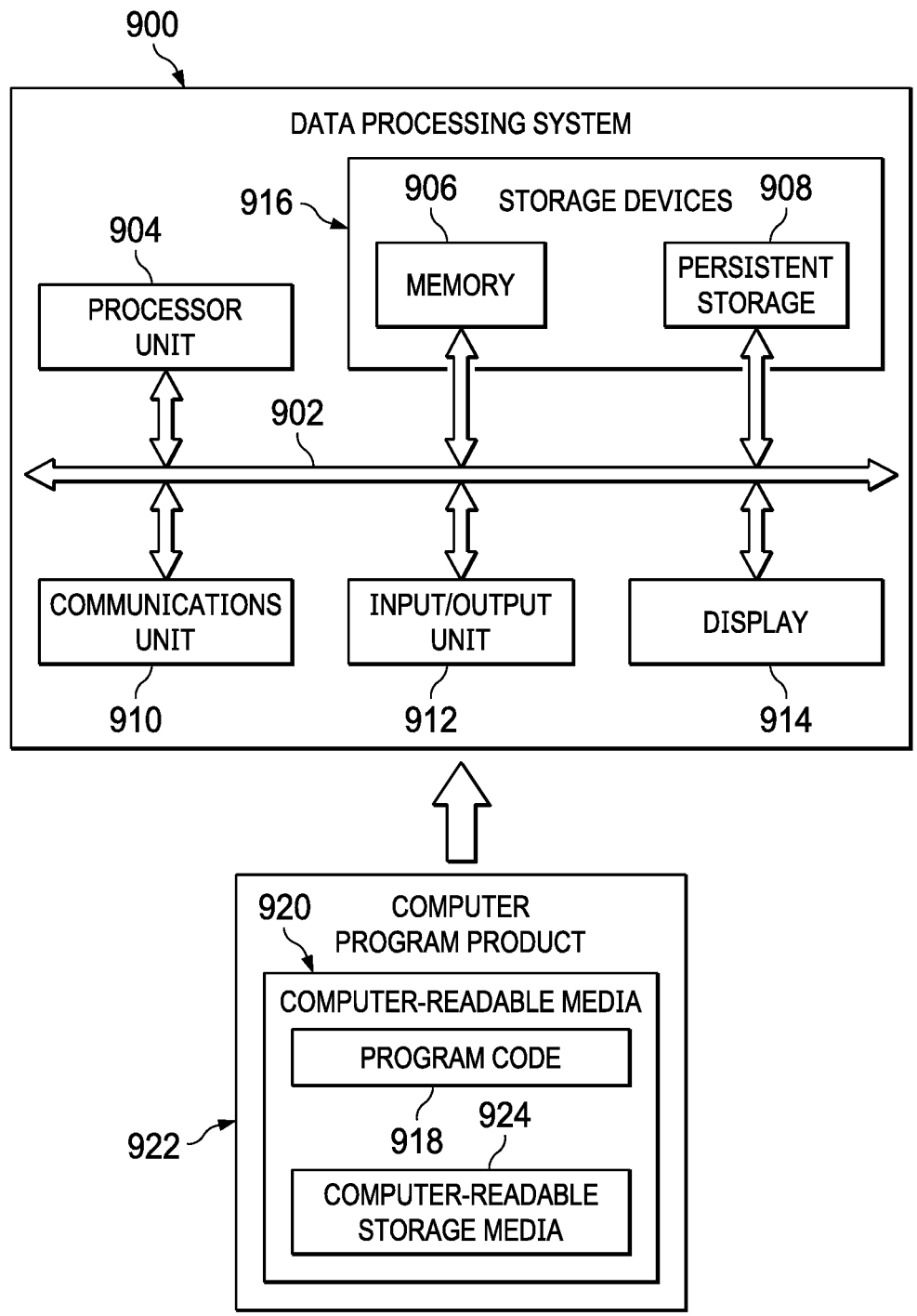
FIG. 9 is a block diagram of a data processing system in accordance with an illustrative embodiment.

Turning now to FIG. 9, a block diagram of a data processing system is depicted in accordance with an illustrative embodiment. Data processing system 900 can be used to implement server computer 104, server computer 106, client devices 110, in FIG. 1. In this illustrative example, data processing system 900 includes communications framework 902, which provides communications between processor unit 904, memory 906, persistent storage 908, communications unit 910, input/output (I/O) unit 912 and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 may take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 may provide a connection for user input through at least one of a keyboard, a mouse, or some other suitable input device. Further, input/output unit 912 may send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which may be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 920" can be singular or plural. For example, program code 918 can be located in computer-readable media 920 in the form of a single storage device or system. In another example, program code 918 can be located in computer-readable media 920 that is distributed in multiple data processing systems. In other words, some instructions in program code 918 can be located in one data processing system while other instructions in in program code 918 can be located in one data processing system. For example, a portion of program code 918 can be located in computer-readable media 920 in a server computer while another portion of program code 918 can be located in computer-readable media 920 located in a set of client computers.

The different components illustrated for data processing system 900 are not meant to provide architectural limitations to the manner in which different embodiments can be implemented. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 906, or portions thereof, may be incorporated in processor unit 904 in some illustrative examples.

Thus, illustrative embodiments by method, apparatus, system, and computer program product for training an artificial intelligence system to recognize the concept. In one illustrative example, an automated process for creating a training data set comprising documents is performed in a manner that provides an information-rich training data sample for training an artificial intelligence model.

Further, in the illustrative example, artificial intelligence models can be trained by processing this automatically generated training data. In illustrative example, the training of the artificial intelligence model can be performed in a manner that enables artificial intelligence models trained to cover a more diverse set of concepts and to be much larger than those created using current processes. Further, the training data sets generated in the illustrative examples can provide artificial intelligence models that are more accurate, robust, and able to serve a wider range of applications as compared to artificial intelligence models generated current training techniques.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method of determining controversy voice share, the method comprising:
    using one or more processors to perform the steps of:
        identifying a number of keywords related to a controversy topic;
        identifying a number of information sources relevant to the controversy topic based on occurrences of the keywords within each information source;
        calculating an external voice score for an organization regarding the controversy topic, wherein the external voice score is calculated based on a number of public information sources that are external to the organization;
        calculating an internal voice score for the organization regarding the controversy topic, wherein the internal voice score is calculated based on a number of information sources internal to the organization; and
        calculating an overall voice share of the organization from the external voice score and internal voice score, wherein the overall voice share of the organization represents a proportion of influence the organization contributes to public commentary on the controversy topic relative to other organizations within a same industry sector.

2. The method of claim 1, further comprising:
    calculating an overall public sentiment regarding the controversy topic, wherein overall public sentiment represents an attitude regarding the controversy topic derived from the public information sources that are external to the organization;
    calculating a sector level sentiment for a sector to which the organization belongs, wherein the sector level sentiment represents the general attitude of the sector relative to the controversy topic is derived from the overall public sentiment and a sector level voice share; and
    calculating an organization level sentiment for the organization, wherein the organization level sentiment is derived from the sector level sentiment and the overall voice share of the organization.

3. The method of claim 1, wherein identifying keywords related to the topic comprises:
    identifying a first number of keywords related to the topic from a number of reference sources that provide definitions or explanations of the topic; and
    identifying, through automated phrase extraction, a second number of keywords related to the topic in the reference sources, wherein the phrase extraction correlates the first number of keywords to the second number of keywords.

4. The method of claim 3, further comprising filtering the first and second number of keywords with natural language processing.

5. The method of claim 1, wherein identifying the information sources relevant to the topic comprises:
    identifying a number of candidate information sources that include keywords in headers;
    vectorizing text in the candidate information sources;
    building a topic profile based on the text vectorization;
    measuring similarities between the topic and the candidate information sources according to the profile; and
    identifying relevant information sources according to a threshold of similarity between information sources and the topic.

6. The method of claim 1, wherein:
    the internal voice score and external voice score are observations of a prior distribution for a Bayesian inference; and
    the overall voice share is a Bayesian posterior expectation.

7. The method of claim 1, wherein the internal voice score is weighted according by a market capitalization of the organization.

8. The method of claim 1, wherein the information sources external to the organization are weighted equally when calculating the external voice score.

9. The method of claim 1, wherein the information sources external to the organization comprise at least one of:
    news media; and
    social media.

10. The method of claim 1, wherein the information sources internal to the organization comprise earnings transcripts.

11. A system for of determining controversy voice share, the system comprising:
    a storage device configured to store program instructions; and
    one or more processors operably connected to the storage device and configured to execute the program instructions to cause the system to:
        identify a number of keywords related to a controversy topic;
        identify a number of information sources relevant to the controversy topic based on occurrences of the keywords within each information source;
        calculate an external voice score for an organization regarding the controversy topic, wherein the external voice score is calculated based on a number of public information sources that are external to the organization;

calculate an internal voice score for the organization regarding the controversy topic, wherein the internal voice score is calculated based on a number of information sources internal to the organization; and calculate an overall voice share of the organization from the external voice score and internal voice score, wherein the overall voice share of the organization represents a proportion of influence the organization contributes to public commentary on the controversy topic.

12. The system of claim 11, wherein the processors further execute instructions to cause the system to:

calculate an overall public sentiment regarding the controversy topic, wherein overall public sentiment represents an attitude regarding the controversy topic derived from the public information sources that are external to the organization;

calculate a sector level sentiment for a sector to which the organization belongs, wherein the sector level sentiment represents the general attitude of the sector relative to the controversy topic is derived from the overall public sentiment and a sector level voice share; and calculate an organization level sentiment for the organization, wherein the organization level sentiment is derived from the sector level sentiment and the overall voice share of the organization.

13. The system of claim 11, wherein identifying keywords related to the topic comprises:

identifying a first number of keywords related to the topic from a number of reference sources that provide definitions or explanations of the topic; and identifying, through automated phrase extraction, a second number of keywords related to the topic in the reference sources, wherein the phrase extraction correlates the first number of keywords to the second number of keywords.

14. The system of claim 13, wherein the processors further execute instructions to cause the system to filter the first and second number of keywords with natural language processing.

15. The system of claim 11, wherein identifying the information sources relevant to the topic comprises:

identifying a number of candidate information sources that include keywords in headers;

vectorizing text in the candidate information sources;

building a topic profile based on the text vectorization;

measuring similarities between the topic and the candidate information sources according to the profile; and identifying relevant information sources according to a threshold of similarity between information sources and the topic.

16. The system of claim 11, wherein:

the internal voice score and external voice score are observations of a prior distribution for a Bayesian inference; and the overall voice share is a Bayesian posterior expectation.

17. The system of claim 11, wherein the internal voice score is weighted according by a market capitalization of the organization.

18. The system of claim 11, wherein the information sources external to the organization are weighted equally when calculating the external voice score.

19. The system of claim 11, wherein the information sources external to the organization comprise at least one of:

news media; and
social media.

20. The system of claim 11, wherein the information sources internal to the organization comprise earnings transcripts.

21. A computer program product for determining controversy voice share, the computer program product comprising:

a computer-readable storage medium having program instructions embodied thereon to perform the steps of:

identifying a number of keywords related to a controversy topic;

identifying a number of information sources relevant to the controversy topic based on occurrences of the keywords within each information source;

calculating an external voice score for an organization regarding the controversy topic, wherein the external voice score is calculated based on a number of public information sources that are external to the organization;

calculating an internal voice score for the organization regarding the controversy topic, wherein the internal voice score is calculated based on a number of information sources internal to the organization; and calculating an overall voice share of the organization from the external voice score and internal voice score, wherein the overall voice share of the organization represents a proportion of influence the organization contributes to public commentary on the controversy topic relative to other organizations within a same industry sector.

22. The computer program product of claim 21, further comprising instructions for:

calculating an overall public sentiment regarding the controversy topic, wherein overall public sentiment represents an attitude regarding the controversy topic derived from the public information sources that are external to the organization;

calculating a sector level sentiment for a sector to which the organization belongs, wherein the sector level sentiment represents the general attitude of the sector relative to the controversy topic is derived from the overall public sentiment and a sector level voice share; and calculating an organization level sentiment for the organization, wherein the organization level sentiment is derived from the sector level sentiment and the overall voice share of the organization.

23. The computer program product of claim 21, wherein identifying keywords related to the topic comprises:

identifying a first number of keywords related to the topic from a number of reference sources that provide definitions or explanations of the topic; and identifying, through automated phrase extraction, a second number of keywords related to the topic in the reference sources, wherein the phrase extraction correlates the first number of keywords to the second number of keywords.

24. The computer program product of claim 23, further comprising filtering the first and second number of keywords with natural language processing.

25. The computer program product of claim 21, wherein identifying the information sources relevant to the topic comprises:

identifying a number of candidate information sources that include keywords in headers;

vectorizing text in the candidate information sources;

building a topic profile based on the text vectorization;

measuring similarities between the topic and the candidate information sources according to the profile; and identifying relevant information sources according to a threshold of similarity between information sources and the topic.

26. The computer program product of claim 21, wherein:

the internal voice score and external voice score are observations of a prior distribution for a Bayesian inference; and the overall voice share is a Bayesian posterior expectation.

27. The computer program product of claim 21, wherein the internal voice score is weighted according by a market capitalization of the organization.

28. The computer program product of claim 21, wherein the information sources external to the organization are weighted equally when calculating the external voice score.

29. The computer program product of claim 21, wherein the information sources external to the organization comprise at least one of:

news media; and social media.

30. The computer program product of claim 21, wherein the information sources internal to the organization comprise earnings transcripts.

\* \* \* \* \*